United States Patent
Grieser et al.

(10) Patent No.: US 6,971,357 B2
(45) Date of Patent: Dec. 6, 2005

(54) METHOD FOR PREPARING AN INTERNAL COMBUSTION ENGINE FOR STARTING

(75) Inventors: Klemens Grieser, Langenfeld (DE); Ulrich Kramer, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 10/435,207

(22) Filed: May 9, 2003

(65) Prior Publication Data

US 2003/0213454 A1 Nov. 20, 2003

(30) Foreign Application Priority Data

May 14, 2002 (EP) .................................. 02100492

(51) Int. Cl.$^7$ ............................................ F02N 17/00
(52) U.S. Cl. ................................................ 123/179.18
(58) Field of Search .......................... 123/179.3, 179.5, 123/179.18, 76, 198 DB, 568.21; 60/307

(56) References Cited

U.S. PATENT DOCUMENTS

| | | |
|---|---|---|
| 3,867,919 A | 2/1975 | Grenier et al. |
| 4,744,338 A * | 5/1988 | Sapienza, IV ............ 123/90.15 |
| 5,435,129 A * | 7/1995 | Hosoya et al. ................. 60/284 |
| 6,098,585 A | 8/2000 | Brehob et al. |
| 6,182,449 B1 * | 2/2001 | Halimi et al. .................. 60/612 |
| 6,195,985 B1 | 3/2001 | Del Re et al. |
| 6,276,317 B1 | 8/2001 | Yoeda et al. |
| 6,474,291 B2 | 11/2002 | Collins et al. |

FOREIGN PATENT DOCUMENTS

| | | |
|---|---|---|
| DE | 19735455 C1 | 11/1998 |
| DE | 19808472 A1 | 9/1999 |
| DE | 19848368 A1 | 4/2000 |
| DE | 1074713 A1 | 7/2000 |
| DE | 10024438 A1 | 11/2001 |
| GB | 2364137 A | 1/2002 |
| WO | WO01/48373 A1 | 7/2001 |

* cited by examiner

*Primary Examiner*—Andrew M. Dolinar
(74) *Attorney, Agent, or Firm*—Diana D. Brehob

(57) ABSTRACT

The invention relates to a method for improving the initial conditions for starting a direct injection, spark-ignition internal combustion engine. Measures, such as adjusting the throttle valve, a varying inlet and exhaust valve timings, operating a secondary-air pump, ensures that the internal combustion engine, when running down, scavenges exhaust gases from the cylinder by providing fresh air into the. Furthermore, measures are undertaken for the braking and/or active rotation of the internal combustion engine so that it is a suitable position for renewed starting, the restarting being accomplished without the aid of a starter motor.

6 Claims, 1 Drawing Sheet

METHOD FOR PREPARING AN INTERNAL COMBUSTION ENGINE FOR STARTING

FIELD OF THE INVENTION

The invention relates to a method for preparing a direct injection internal combustion engine for starting, in particular, when the engine is started without the aid of a starter motor.

BACKGROUND OF THE INVENTION

To improve fuel economy in vehicles with an internal combustion engine, the engine is often stopped completely when there is no drive power required, instead of idling. The engine is then restarted when power is required again. Typically, internal combustion engines have special devices such as a starter motor or an integrated starter generator capable of rotating the engine to aid the starting process. These are relatively large, heavy, and costly devices, particularly since a high electrical power is necessary for starting the internal combustion engine.

It is known to start an internal combustion engine by the triggering of combustion in an engine at rest. This is possible, in particular, in internal combustion engines with spark ignition and direct injection. The fuel is injected directly into the combustion chamber is ignited by a spark. The subsequent combustion of the air/fuel mixture moves the piston and starts the engine rotating without the crankshaft having to be rotated by a starter device.

To prepare an internal combustion engine for starting initiated or assisted by combustion, various measures are known from the prior art. In DE 100 24 438 A1 and DE 198 08 472 A1, it is proposed, before starting, to cause the crankshaft to be brought by an electric motor into a defined position, from which the subsequent starting of the internal combustion engine can be assisted by combustion, along with reduced compression and a reduced degree of filling. To bring the internal combustion engine into a position suitable for direct starting, it is known furthermore from U.S. Pat. No. 6,098,585 to stop the crankshaft in a desired position by a suitable braking system when the engine is switched off. Moreover, for attaining a suitable position of the crankshaft, it is proposed in WO 01/48373 A1 to provide special ignition and injection pulses. Via these pulses, both a defined further rotation of the internal combustion engine and the stopping of the latter in a specific position are to be achieved.

The inventors of the present invention have also recognized that the success of the restart depends on the in-cylinder conditions, in particular, a maximum of air and a minimum of exhaust gases, which is not usually ensured in conventional internal combustion engines.

SUMMARY OF THE INVENTION

According to a first embodiment, a method for preparing an internal combustion engine for restarting, comprising: replacing exhaust gases in engine cylinders with fresh air during a rundown of the engine is disclosed. The internal combustion engine is preferably an internal combustion engine with direct injection of the fuel into the combustion chambers.

An advantage of the invention is that starterless starting of the engine can take place with greater reliability and efficacy and makes it less sensitive to other boundary conditions, e.g., exact rotational positioning of the engine To supply fresh air to the cylinders to an increased extent, for example, a throttle valve located in the intake system of the internal combustion engine is opened completely during the rundown of the internal combustion engine to purge the cylinders of purged gases. Preferably, the throttle valve is closed shortly before the final stopping of the internal combustion engine to ensure that the engine runs down as smoothly as possible.

Additionally, or alternatively, an increased supply of fresh air may also take place by the provision of a fresh-air duct which is coupled to the cylinders. When the internal combustion engine runs down, the fresh-air duct is opened to the inlet system of the engine or to the atmosphere.

Furthermore, in internal combustion engines with variable valve control, the timing of the inlet valves and outlet valves can be set for a negative valve overlap during the rundown of the internal combustion engine. A negative overlap is when the closing of the outlet valve occurs before the opening of the inlet valve so that they are not opened simultaneously. This minimizes the quantity of exhaust gases which are drawn from the exhaust manifold back into the cylinders during the intake stroke.

Furthermore, to minimize the recirculated quantity of exhaust gas, it is advantageous to interrupt external exhaust gas recirculation during the rundown of the internal combustion engine.

According to another development of the invention, fresh air may be supplied to the exhaust manifold and/or to the cylinders during the rundown of the internal combustion engine or afterward. i.e., when the engine is stopped. This ensures that the engine is not only supplied with fresh air from the intake side, but that gas possibly flowing into the cylinders from the exhaust gas side is not exhaust gas, but fresh air. For the supply of fresh air to the exhaust gas system, it is advantageous to have the secondary air system which is provided in many internal combustion engines for aiding the warm up of a catalytic converter to be operated. Specifically, fresh air can be blown into the exhaust gas manifold runners by a secondary air pump (11).

According to another embodiment of the invention, a method for preparing an internal combustion engine for restarting, comprising replacing exhaust gases in engine cylinders with fresh air after engine rotation has stopped, is also disclosed. After engine rotation has been stopped (for example, due to an interruption in the fuel supply and/or spark), the internal combustion engine can be rotated actively to draw as much fresh air as possible into the cylinders. Active, further rotation may in this case take place using an electric, hydraulic, or mechanical motor such as, for example, the starter or a starter generator.

The invention relates, furthermore, to a method for preparing for starting an internal combustion engine, preferably an internal combustion engine with direct injection, during rundown of the internal combustion engine by braking the engine and/or by actively rotating the crankshaft to ensure a predetermined position of the crankshaft in the switched-off state of the internal combustion engine. As discussed above, for direct starting of an internal combustion engine by fuel injection and sparking, it is advantageous for a piston to be located in specific range of angular positions of the crankshaft. The method is defined in that the braking and/or the active rotation of the crankshaft takes place by: the compressor of an air conditioning system, the pump of a power steering system, a camshaft adjustment device in an internal combustion engine with variable camshaft control, and/or by a variation in the work per unit volume of the internal combustion engine.

The use of a compressor, power steering pump, or camshaft adjustment device for braking or rotating the internal combustion engine has the advantage that, if the engine is so equipped, no additional components are required. Thus, there is no need to provide specific additional devices for braking the internal combustion engine.

A camshaft adjustment device is used, preferably, when the internal combustion engine is already at a standstill. The camshaft additionally is being blocked by a suitable measure. When the camshaft is fixed in place, activation of the variable camshaft device causes the relative movement between camshaft and crankshaft is converted completely into a rotation of the crankshaft.

Of course, within the scope of the present invention, it is also possible and usually advisable to combine various measures of those mentioned above to maximize the effect capable of being achieved.

The invention relates, furthermore, to an internal combustion engine which is set up for carrying out a method of the type explained above. In particular, an internal combustion engine of this kind may have an engine control which is programmed in such a way that, during a rundown of the internal combustion engine or thereafter, said engine control activates the necessary engine components such as throttle valve, fresh air duct, camshaft control, blocking device for the camshaft, exhaust gas recirculation, secondary-air system, electric, mechanical or hydraulic motors coupled to the internal combustion engine in a way which makes it possible to carry out a method according to the invention.

BRIEF DESCRIPTION OF THE FIGURE

The invention is explained in more detail below, by way of example, with reference to the drawing.

DETAILED DESCRIPTION

Figure 1:
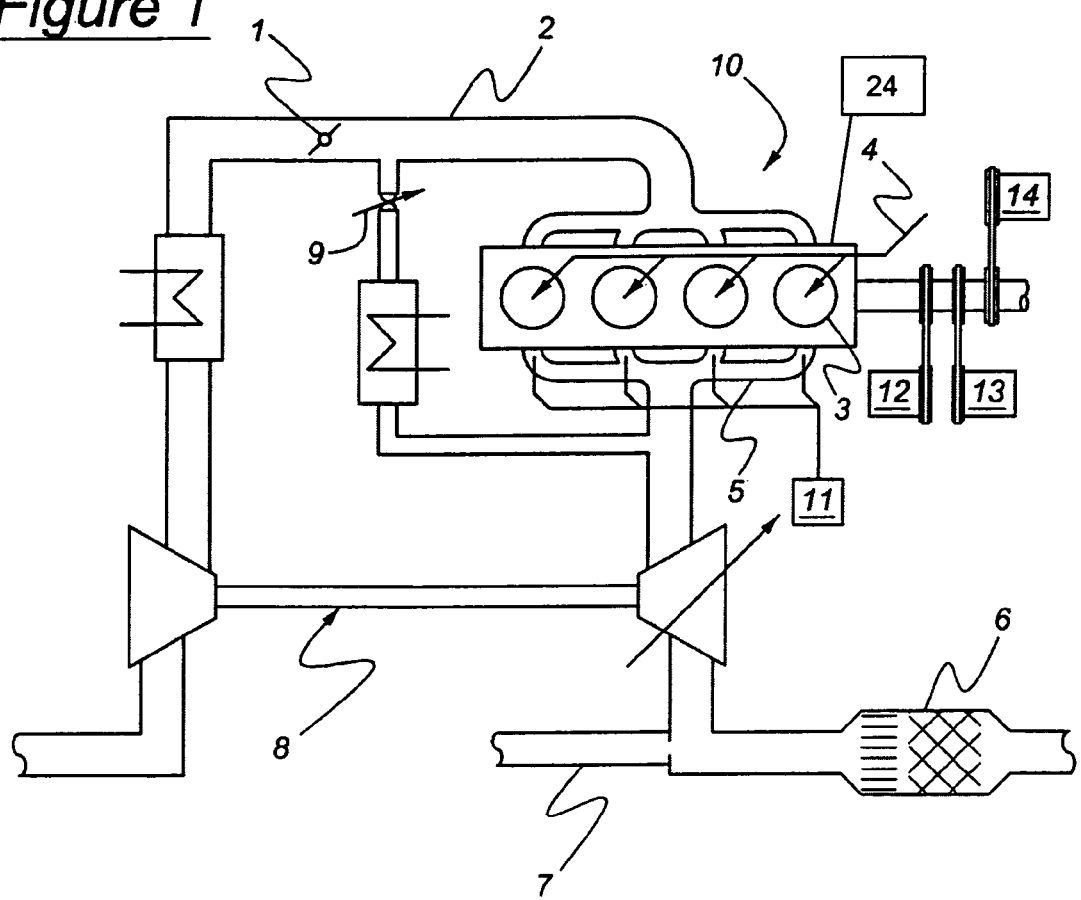
FIG. 1 shows diagrammatically the components of an internal combustion engine in which the method according to the invention can be applied.

Internal combustion engine 10 with direct injection of gasoline via fuel supply 4 leading into cylinders 3 is illustrated in FIG. 1. Such an engine with direct injection has the advantage that fuel can be supplied to the cylinders directly, in contrast to a port fuel injected engine in which the fuel is supplied into intake ports which are separated from engine cylinders by inlet valves. That fuel can evaporate forming a fuel-air mixture in cylinders 3 and then ignited by a spark plug firing. These are accomplished irrespective of a starter motor having to drive the crankshaft during a starting phase.

The internal combustion engine 10 has, furthermore, an intake manifold 2 for the supply of fresh air, the supply rate of which can be set via throttle valve 1. Exhaust gases from internal combustion engine 10 are discharged via exhaust manifold 5 and a catalytic converter 6 arranged in the exhaust line. Moreover, in the figure, exhaust gas recirculation (EGR) 9 is controlled by an EGR valve to control the amount of exhaust gas which is transported to the intake side. In one alternative, to increase the amount of air delivered to the engine, a turbocharger 8 is provided, with the turbine portion located in the exhaust line. The compressor, which is in the inlet line, is driven by the shaft of the turbine.

So that the above-described starterless starting of the internal combustion engine 10 can be carried out successfully, it is advantageous for a cylinder 3 to be in a suitable position at the commencement of starting. Such a suitable position can be ensured either in that the internal combustion engine, when previously switched off, is stopped in this position or in that, during or after it is switched off, it is rotated actively into this position.

Shutting down of the internal combustion engine 10 in a desired crankshaft angle range may be achieved, for example, by the following measures:

by an electric, hydraulic or mechanical deceleration device such as, for example, an eddy-current brake which acts in a controlled way on the crankshaft during the stopping of the internal combustion engine;

by a controlled ignition of the internal combustion engine 10 well before the top dead center of the piston is reached in a cylinder 3, thereby slowing the rotation of the crankshaft by "early combustion";

by using the alternator (14) as a brake, to stop the internal combustion engine in a controlled crankshaft angle range;

by using the compressor of the air conditioning system (12) to stop the internal combustion engine in a controlled crankshaft angle range;

by using the pump of the power steering system (13) to stop the internal combustion engine in a controlled crankshaft angle range;

by varying the intake pressure in intake manifold (2) via a defined opening of throttle valve 1 to control the pumping work and compression work; and/or by varying the camshaft timing by a variable camshaft timing control device (24) to control the charge exchange work, compression work, and expansion work.

After the engine has stopped, further rotation of the internal combustion engine 10 into a suitable crankshaft angle range, is possible, via the following measures:

by an electric, hydraulic or mechanical device on the crankshaft to position the engine in one of the desired rotational position ranges;

by using a conventional starter or alternator (14) as a positioning motor;

by using the pump of the power steering system (13) which is supplied with hydraulic energy, as a positioning motor; and/or by using a variable camshaft timing device (24) which is operated electrically or hydraulically from an oil pressure reservoir.

The variable camshaft timing device causes a relative rotation between crankshaft and camshaft. Preferably, in this case, on the internal combustion engine, an additional device is provided (not shown) which can block or brake the rotation of the camshaft. When the variable camshaft timing device is activated, the relative rotation acts on the crankshaft moving it into the desired position.

While the measures explained above serve for bringing the crankshaft of the internal combustion engine into a position suitable for renewed starterless starting, further measures for improving the initial conditions for such a starting may be initiated according to the invention. In particular, the desire if for the cylinders to contain fresh air, instead of exhaust gases, during restarting of the internal combustion engine 10. The following measures are adopted to provide fresh air in the cylinders during shutdown of internal combustion engine 10:

a controlled (complete or partial) opening of throttle valve 1 arranged in the intake manifold 2, when stopping of the internal combustion engine 10 is induced and the fuel supply 4 and the spark ignition are switched off. The switched-off internal combustion engine thereby draws maximum fresh air into the cylinders and removes residual gases from the cylinders while the internal combustion engine runs down (that is to say, while the crankshaft is braked from idling rotational speed to standstill). Preferably, in this case, throttle valve 1 is completely opened immediately after the engine is switched off to scavenge the cylinders with fresh air. Shortly before the crankshaft ceases to rotate, throttle valve 1 is preferably closed again, to cause the internal combustion engine 10 to stop smoothly;

an additional fresh air inlet (not shown) to cylinders 3, which is coupled to the inlet system or the ambient atmosphere, when can be opened when the engine 10 is switched off so that the internal combustion engine 10 draws in scavenging cylinders 3 with fresh air;

setting of a negative valve overlap by control of variable camshaft timing devices and/or closing of the EGR 9 valve when a stopping of internal combustion engine 10 is initiated. In this way, the switched-off internal combustion engine 10, while it is running down, can draw in a lesser amount of residual gases from exhaust manifold 5;

activating a secondary-air system when stopping of the internal combustion engine is initiated. A secondary-air system 7 of this kind is provided in many internal combustion engines, so that additional fresh air can be supplied to rich exhaust gases from the engine to create an exotherm in the exhaust system to rapidly heat up the catalytic converter 6 during starting. The activation of the secondary-air system provides fresh air for the exhaust gas system 5, so that the switched-off internal combustion engine 10, while it is running down, can draw in fresh air not only from the inlet manifold 2, but also from the exhaust gas system 5. This procedure is advantageously combined with an increased valve overlap and with a late closing of the outlet valve or outlet valves, to maximize the intake of fresh air;

the pump of the secondary-air system or another pressure pump or vacuum pump (for example, a vacuum pump for a brake booster, not shown) is used to provide fresh air to the cylinders when an engine stop is initiated.

One or more of the following can be employed after the engine is stopped and before restarting internal combustion engine 10. These measures increase the quantity of fresh air in cylinders 3:

an electrically, hydraulically, or mechanically driven pressure pump (in addition or already present, for example as a pump for the secondary air) or vacuum pump (in addition or already present, for example as a vacuum pump for the brake booster), which is supplied energy from a storage device, such as a battery or a pressure reservoir, may be used for providing additional fresh air to cylinders 3 during standstill of engine 10;

using an electric, hydraulic or mechanical motor, such as, for example, the starter, which is supplied with energy from a storage, such as a battery or a pressure reservoir, the internal combustion engine 10 can be cranked to draw fresh air into the cylinders.

The measures explained above may, as desired, be combined with one another to maximize the effects capable of being achieved thereby.

We claim:

1. A method for preparing an internal combustion engine for restarting, comprising:
    replacing exhaust gases in engine cylinders with fresh air after engine rotation has stopped; and
    braking the engine during a rundown of the engine, such braking being accomplished to stop the engine in predetermined ranges of rotational positions when the engine is in a switched-off state wherein said braking is supplied by a variable camshaft timing device.

2. The method of claim 1, further comprising:
    blocking a camshaft of the engine to prevent rotation of said camshaft; activating a camshaft timing device coupled to said camshaft, said activation causing an engine crankshaft coupled to said camshaft to rotate.

3. A method for preparing an internal combustion engine for restarting, comprising:
    replacing exhaust gases in engine cylinders with fresh air after engine rotation has stopped; and
    providing a rotational energy to a crankshaft of the engine during a rundown of the engine, such rotational energy being supplied so as to stop the engine in predetermined ranges of positions when the engine is in a switched-off state wherein said rotational energy is supplied by one or more of an air-conditioning compressor and a power steering pump.

4. The method of claim 1 wherein a secondary air pump coupled to the engine provides said fresh air into engine cylinders.

5. The method of claim 3 wherein a secondary air pump coupled to the engine provides said fresh air into engine cylinders.

6. A method for preparing an internal combustion engine for restarting, comprising:
    replacing exhaust gases in engine cylinders with fresh air after engine rotation has stopped; and
    braking the engine during a rundown of the engine, such braking being accomplished to stop the engine in predetermined ranges of rotational positions when the engine is in a switched-off state wherein said braking is supplied by one or more of an air-conditioning compressor and a power steering pump.

* * * * *